(12) United States Patent  
Song et al.

(10) Patent No.: US 8,000,426 B2
(45) Date of Patent: Aug. 16, 2011

(54) MECHANISM FOR CONSTRUCTING AN OVERSAMPLED WAVEFORM FOR A SET OF SIGNALS RECEIVED BY A RECEIVER

(75) Inventors: Deqiang Song, San Diego, CA (US); Dawei Huang, San Diego, CA (US); Drew G. Doblar, San Jose, CA (US); Michael Stephen Harwood, Rushden (GB); Nirmal C. Warke, Irving, TX (US)

(73) Assignee: Oracle America, Inc., Redwood City, CA (US)

( * ) Notice: Subject to any disclaimer, the term of this patent is extended or adjusted under 35 U.S.C. 154(b) by 727 days.

(21) Appl. No.: 12/053,121

(22) Filed: Mar. 21, 2008

(65) Prior Publication Data

US 2009/0238318 A1 Sep. 24, 2009

(51) Int. Cl.
*H04L 7/00* (2006.01)
(52) U.S. Cl. .................................. 375/355; 341/155
(58) Field of Classification Search .............. 341/100, 341/155; 370/506; 375/355, 365
See application file for complete search history.

(56) References Cited

U.S. PATENT DOCUMENTS

2002/0145547 A1* 10/2002 May .................................. 341/61
2002/0190886 A1* 12/2002 Ignjatovic et al. ............. 341/155
* cited by examiner

*Primary Examiner* — David C. Payne
*Assistant Examiner* — Leon-Viet Q Nguyen
(74) *Attorney, Agent, or Firm* — Osha • Liang LLP

(57) ABSTRACT

A mechanism is provided for constructing an oversampled waveform for a set of incoming signals received by a receiver. In one implementation, the oversampled waveform is constructed by way of cooperation between the receiver and a waveform construction mechanism (WCM). The receiver receives the incoming signals, samples a subset of the incoming signals at a time, stores the subsets of sample values into a set of registers, and subsequently provides the subsets of sample values to the WCM. The WCM in turn sorts through the subsets of sample values, organizes them into proper orders, and "stitches" them together to construct the oversampled waveform for the set of incoming signals. With proper cooperation between the receiver and the WCM, and with proper processing logic on the WCM, it is possible to construct the oversampled waveform for the incoming signals without requiring large amounts of resources on the receiver.

20 Claims, 8 Drawing Sheets

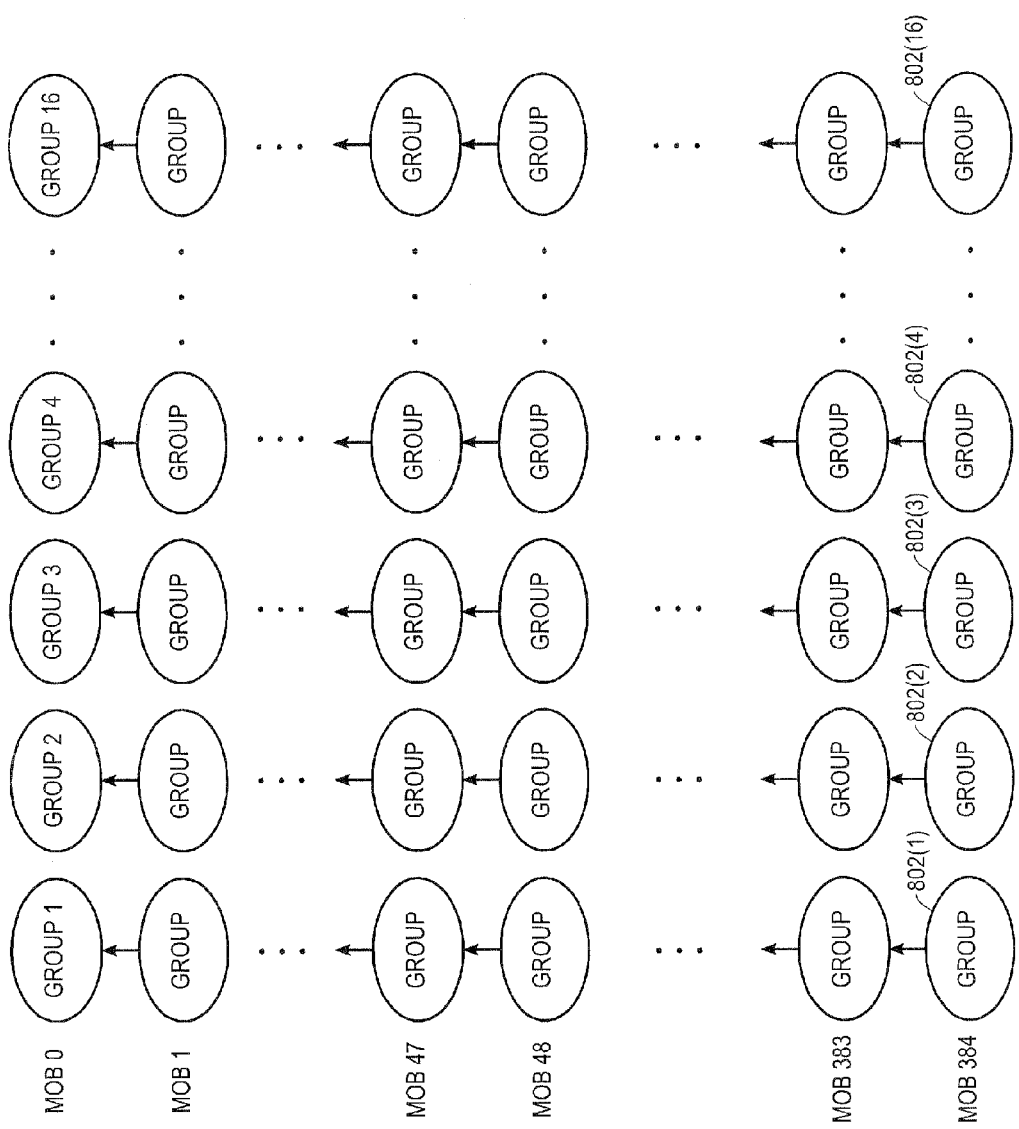

MECHANISM FOR CONSTRUCTING AN OVERSAMPLED WAVEFORM FOR A SET OF SIGNALS RECEIVED BY A RECEIVER

BACKGROUND

In many of today's integrated circuits (IC's), serializer/deserializer (SerDes) circuits are implemented to enable the IC's to exchange information with each other and with other components at very high data rates. The SerDes circuits include a transmitter and a receiver. Typically, information is sent from a transmitter on one IC to a receiver on another IC through a series of analog pulses. Specifically, to send a digital bit of information, a transmitter determines whether the bit that it wants to send is a digital 1 or a digital 0. If the bit is a digital 1, the transmitter generates an analog signal (which may be made up of a single signal or a pair of differential signals) having a positive voltage. If the bit is a digital 0, the transmitter generates an analog signal having a negative voltage. After generating the analog signal, the transmitter sends the analog signal as a pulse having a certain duration to the receiver along a communications link. Upon receiving the analog signal, the receiver determines whether the analog signal has a positive voltage or a negative voltage. If the voltage is positive, the receiver determines that the analog signal represents a digital 1. If the voltage is negative, the receiver determines that the analog signal represents a digital 0. In this manner, the transmitter is able to provide digital information to the receiver using analog signals.

Ideally, the receiver should receive analog pulses that closely resemble the analog pulses that were sent by the transmitter. Unfortunately, due to a pulse response effect that is experienced at high data rates, this ideal cannot be achieved. In fact, the analog signal that is received by the receiver often differs from the pulse that was sent by the transmitter by such a degree that it is often difficult for the receiver to determine whether the received analog signal represents a digital 1 or a digital 0.

To elaborate upon the concept of a pulse response, reference will be made to the sample pulse response shown in FIG. 1. FIG. 1 shows an example of what may be received by a receiver in response to a single positive-voltage pulse (representing a digital 1) sent by the transmitter. In the example shown in FIG. 1, the pulse is sent by the transmitter in time interval x−4 and received by the receiver four time intervals later beginning with time interval x. Notice that even though the transmitter sent a pulse lasting only a single time interval, the receiver does not receive that pulse in just a single time interval. Instead, the receiver receives an analog signal that lasts for several time intervals. During time interval x, the received signal has a magnitude of h0. During the next time interval (interval x+1), the received signal still has a magnitude of h1. During the next several time intervals, the received signal still has magnitudes of h2, h3, h4, and so on. Thus, even though the transmitter sent a pulse lasting only one time interval, the receiver receives a signal that lasts for many time intervals.

Because of this pulse response effect, a pulse sent in one time interval affects pulses sent in future time intervals. To illustrate, suppose that the transmitter sends another positive-voltage pulse in time interval x−3, and that this pulse is received by the receiver beginning in time interval x+1. During time interval x+1, the receiver would sense the h0 voltage of the pulse sent in time interval x−3. The receiver would also sense the h1 voltage of the pulse previously sent in time interval x−4. Suppose further that the transmitter sends another positive-voltage pulse in time interval x−2, and that this pulse is received by the receiver beginning in time interval x+2. During time interval x+2, the receiver would sense the h0 voltage of the pulse sent in time interval x−2. The receiver would also sense the h1 voltage of the pulse previously sent in time interval x−3. In addition, the receiver would sense the h2 voltage of the pulse previously sent in time interval x−4. Thus, the voltage sensed by the receiver at time interval x+2 is an accumulation of the effects of the pulses sent at time intervals x−4, x−3, and x−2 (and even pulses sent at time intervals before x−4). As this example shows, when the receiver senses a voltage during a time interval, it does not sense the effect of just one pulse but the accumulation of the effects of multiple pulses.

FIG. 1 shows the pulse response for a single positive-voltage pulse. The pulse response for a single negative-voltage pulse (representing a digital 0) is shown in FIG. 2. Notice that the pulse response of FIG. 2 is similar to the pulse response of FIG. 1 except that the voltages are negative instead of positive. Thus, as shown by FIGS. 1 and 2, the effect that a pulse has on future pulses will depend on whether that pulse is a positive-voltage pulse (representing a digital 1) or a negative-voltage pulse (representing a digital 0). If a pulse is a positive-voltage pulse, it will add to the voltages of future pulses. Conversely, if the pulse is a negative-voltage pulse, it will subtract from the voltages of future pulses.

As can be seen from the above discussion, a pulse response can significantly affect the signals that are received by a receiver. Thus, it is highly desirable in many implementations to ascertain the pulse response effect that is experienced by a receiver. Armed with knowledge of the pulse response, it may be possible to compensate for its effects. It may also be possible to use the pulse response information to adjust the parameters of the transmitter and/or receiver and perhaps even other components to improve the overall performance of the transmission/reception process. These and other uses of the pulse response information are possible. A point to note is that a pulse response is a characterization of the link performance of the communications link to which a receiver is coupled. Because each receiver is coupled to a different communications link, each receiver may and most likely will experience a different pulse response effect. Thus, a pulse response is determined on a per receiver/communications link basis.

A pulse response for a receiver/communications link may be determined by sending a set of predetermined analog pulses (representing a predetermined bit pattern) from a transmitter to a receiver along a communications link, and capturing a waveform of the signals actually received by the receiver. Once the waveform is captured, it can be processed and compared with an ideal waveform to derive a pulse response for the receiver/communications link. The difficult part of this process, however, is capturing the waveform in a practical and feasible manner.

One possible approach to capturing the waveform is to implement sufficient sampling and storage components on each receiver to enable the receiver to capture an oversampled waveform for the signals received by the receiver. To illustrate how this may be done, suppose that a predetermined 128 bit pattern is sent by a transmitter to a receiver over 128 time intervals. Suppose further that it is desirable for the receiver to oversample the signals received by the receiver 48 times (i.e. take 48 samples of the incoming signals per time interval). To capture such a waveform, the receiver would need a sampling clock signal that is 48 times faster than the incoming data clock. During each time interval, the receiver would sample the analog signal received during that time interval 48 times. For each sample, the receiver would sense an analog signal and convert it into a corresponding x-bit (e.g. 4-bit) digital value. Each x-bit digital value would be stored in a register. At the end of the 128 time intervals, the receiver will have captured all of the sample values needed to form an oversampled waveform for the incoming signals.

A problem with this approach, however, is that it is quite resource intensive. In order to capture the entire oversampled waveform, the receiver would need 48×128 or 6,144 x-bit registers just to store all of the digital sample values. In addition, the receiver would need to have components for implementing the sampling and storage functions. These components and storage consume a significant amount of chip space. In a large scale IC (e.g. a microprocessor), which can comprise a very large number of receivers, chip space is precious, and in most implementations, it is not practical for each receiver to consume a large amount of chip space. Because of these and other practical considerations, this approach to capturing an oversampled waveform cannot be feasibly implemented in most applications.

BRIEF DESCRIPTION OF THE DRAWINGS

FIG. 8 depicts 384 mobs of sample values, wherein each mob has 16 groups of sample values, wherein each group of sample values in a mob is associated with a corresponding group in an immediately preceding mob, and wherein the samples in different mobs are taken at different sampling points.

DETAILED DESCRIPTION OF EMBODIMENT(S)

Conceptual Overview

In one embodiment of the present invention, an improved mechanism is provided, which enables an oversampled waveform to be constructed for a set of signals received by a receiver, but which does not require an exorbitant amount of resources on the receiver. In accordance with this embodiment, the oversampled waveform is constructed by way of cooperation between the receiver and a waveform construction mechanism (WCM). The receiver receives the incoming signals, samples the incoming signals, stores subsets of sample values into a set of registers, and subsequently provides the subsets of sample values to the WCM. The WCM in turn sorts through the subsets of sample values, groups them, organizes them into proper order, and "stitches" them together to construct the oversampled waveform for the set of signals.

To limit the amount of resources implemented on the receiver, the receiver in one embodiment is not endowed with enough storage to store all of the sample values for all of the incoming signals. Rather, the receiver is implemented with sufficient storage to store just a subset of the sample values at a time. This means that even though the receiver is sampling all of the incoming signals, it is storing only a subset of the sample values at a time into a set of registers (note: because the receiver stores only a subset of the sample values at a time, the incoming signals are sent repeatedly by the transmitter; over time, the receiver will eventually store all of the subsets of sample values corresponding to all of the incoming signals). After a subset of sample values are stored, they are provided to the WCM. Thereafter, the receiver stores another subset of sample values into the same set of registers (i.e. the register values are overwritten with the new sample values; that way, only one set of registers is needed), and provides those sample values to the WCM. The receiver does this repeatedly so that the WCM receives a plurality of sets of sample values from the receiver.

In one embodiment, the sets of sample values sent by the receiver are not sent in any predetermined order; thus, it is not immediately clear to the WCM how the sets of sample values relate to each other and in what order they should be arranged to construct the oversampled waveform. In one embodiment, it is up to the WCM to sort, group, and order the sets of sample values, and to "stitch" them together to construct the oversampled waveform. The manner in which this may be done in accordance with one embodiment of the present invention will be described in detail in later sections. With proper cooperation between the receiver and the WCM, and with proper processing logic on the WCM, it is possible to construct the oversampled waveform for the incoming signals without requiring large amounts of resources on the receiver.

System Overview

Figure 1:
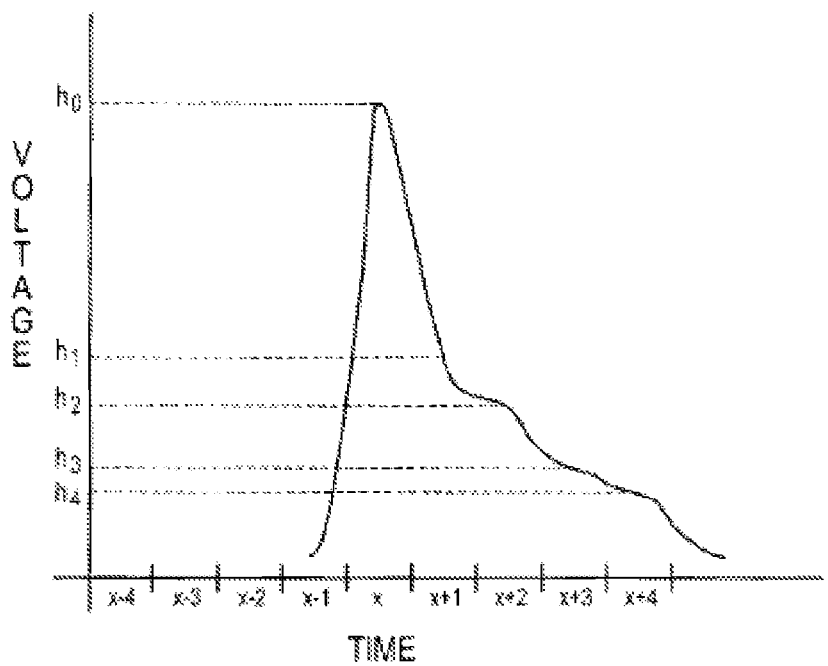
FIG. 1 shows a sample pulse response for a positive-voltage pulse.
Figure 2:
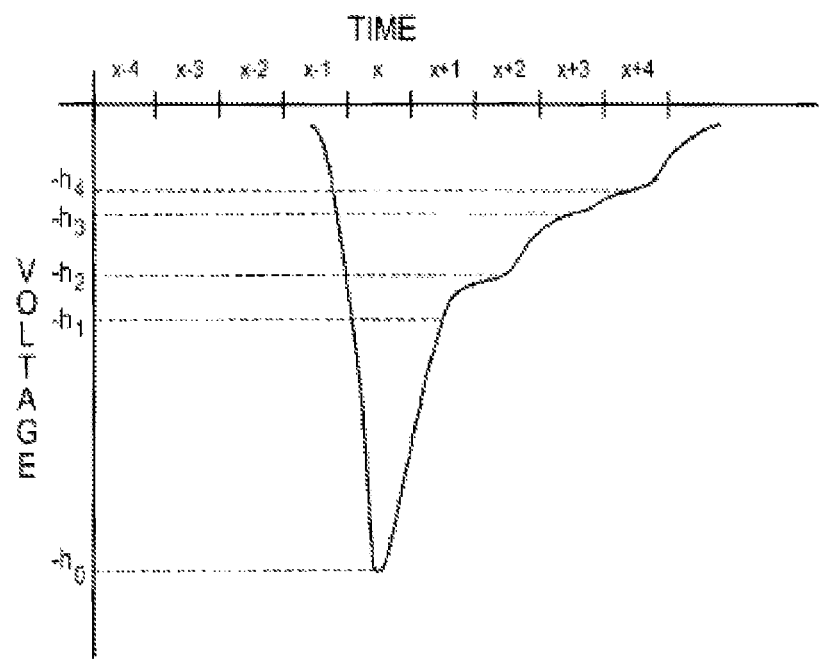
FIG. 2 shows a sample pulse response for a negative-voltage pulse.
Figure 3:
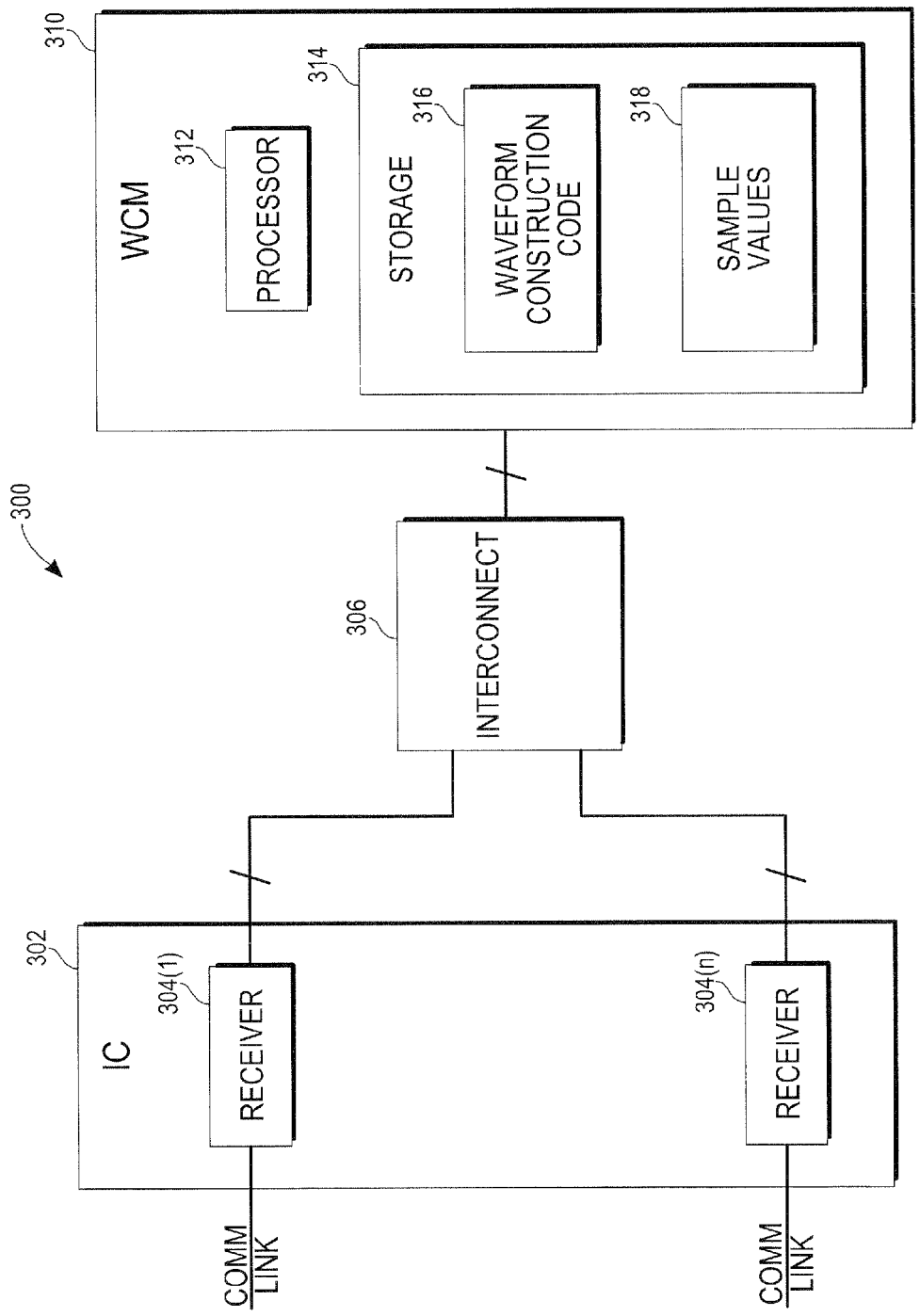
FIG. 3 is a block diagram of a system in which one embodiment of the present invention may be implemented.

With reference to FIG. 3, there is shown a block diagram of a system 300 in which one embodiment of the present invention may be implemented. As shown, system 300 comprises an IC 302, an interconnect 306, and a WCM 310. For the sake of simplicity, only one IC 302 is shown; however, it should be noted that the WCM 310 may be used to service any number of IC's.

As shown in FIG. 3, the IC 302 comprises a plurality of receivers 304(1)-304(n). Each receiver 304 is coupled to a corresponding communications link for receiving incoming signals sent by a corresponding transmitter (not shown). Each receiver 304 is also coupled to the interconnect 306 to enable the receiver 304 to interact with the WCM 310. For purposes of the present invention, the interconnect 306 may be any type of interconnect (e.g. switches, multiplexers/demultiplexers, crossbar interconnect, wires, etc.) that is capable of selectively coupling each of the receivers 304 to the WCM 310. When coupled to a receiver 304, the WCM 310 interacts with that receiver to construct an oversampled waveform for the signals received by that receiver. That waveform may thereafter be used to derive a pulse response for the receiver and the communications link to which that receiver is coupled.

In one embodiment, the WCM 310 is an off-chip component. That is, the WCM 310 is not implemented on the same chip as the IC 302. By moving the waveform construction capability off-chip, the resources required to be implemented on the receivers 304 are minimized. This in turn enables the chip space consumed by each receiver 304 to be minimized. Despite the decreased chip space, each receiver 304 is still able to interact with the WCM 310 to enable an oversampled waveform to be constructed. Thus, with this arrangement, it is possible to achieve the best of both worlds (i.e. small consumption of chip space by the receivers and construction of an oversampled waveform).

In one embodiment, in addition to being selectively coupled to the receivers 304 via the interconnect 306, the WCM 310 may also be selectively coupled to one or more transmitters (not shown). This coupling enables the WCM 310 to send a control signal to a transmitter to instruct that transmitter to begin sending a test pattern. This will be discussed further in a later section.

In one embodiment, the WCM 310 comprises a processor 312 (or a plurality of processors) and a storage 314. The processor 312 may be a service processor that is already present in many large scale systems. If the processor 312 is a service processor, then the construction of the oversampled waveform may be achieved without adding any hardware to the system. The processor 312 executes a set of waveform construction code 316 stored in a storage 314. Under control of the waveform construction code 316, the processor 312 performs the waveform construction operations that will be described in later sections. In addition to being used to store the waveform construction code 316, the storage 314 may also be used to store the sample values 318 that are received from the receivers 304. In one embodiment, the capacity of the storage 314 is sufficiently large that it can store all of the sample values needed to construct an oversampled waveform for a receiver. For purposes of the present invention, storage 314 may be any type of machine readable storage medium including but not limited to volatile storage (e.g. random access memory (RAM), DRAM, SDRAM, DDR RAM, etc.), non-volatile storage (e.g. magnetic storage, flash memory, EEPROM, optical storage (e.g. CD-RW, etc.), and any other type of storage medium.

In the embodiment described above, the functionality of the WCM 310 is realized using software (i.e. by having processor 312 execute code 316). As an alternative, the functionality of the WCM 310 may also be realized in hardware, for example, by way of an ASIC or a set of hardwired logic components. This and other alternative implementations of the WCM 310 are within the scope of the present invention.

Receiver

Figure 4:
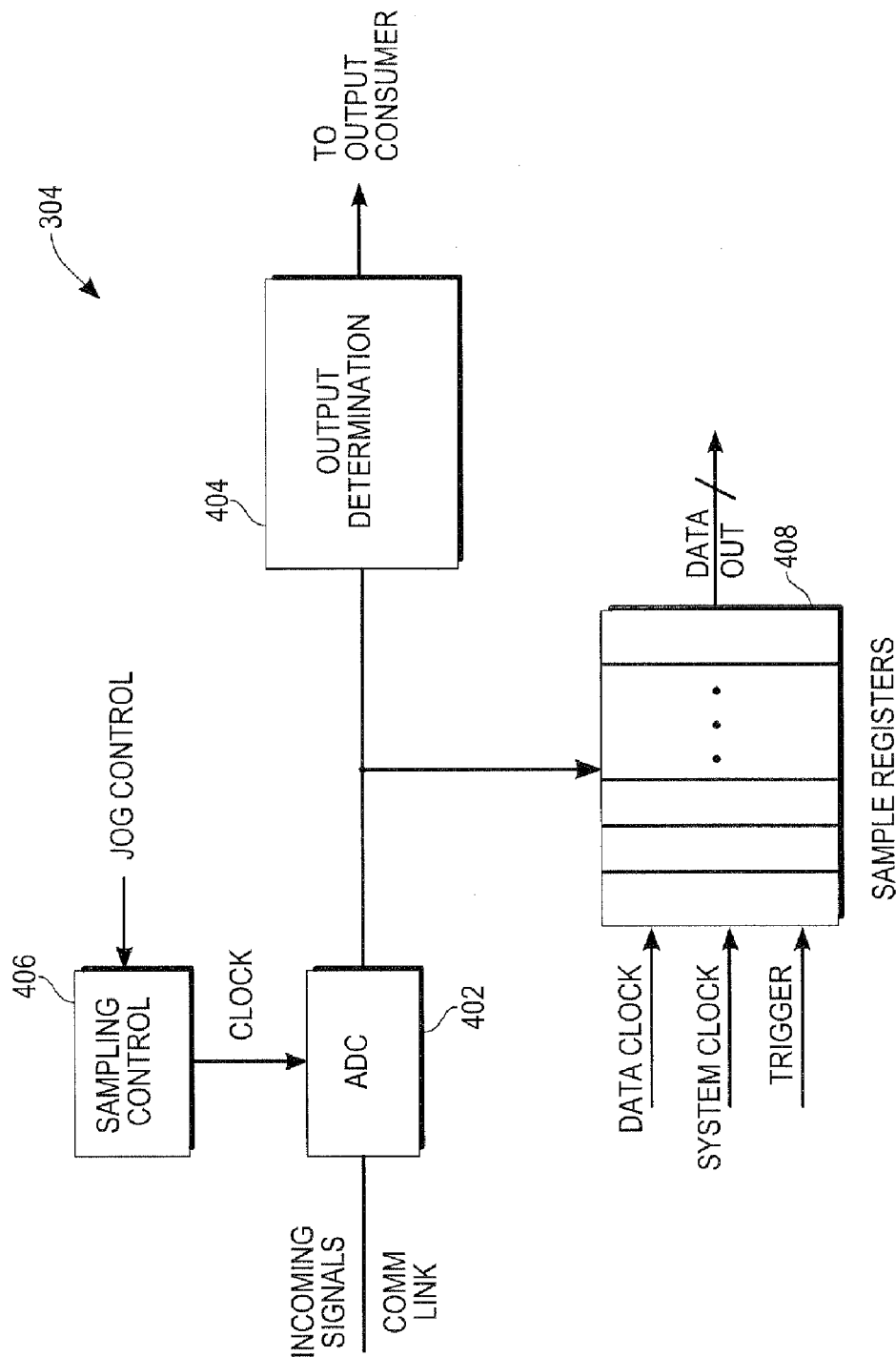
FIG. 4 is a block diagram of a receiver, in accordance with one embodiment of the present invention.

With reference to FIG. 4, there is shown a more detailed block diagram for a receiver 304 in accordance with one embodiment of the present invention. Any or all of the receivers 304(1)-304(n) in IC 302 may take the form of the receiver 304 shown in FIG. 4. As shown, a receiver 304 may comprise an analog-to-digital converter (ADC) 402, an output determination circuit 404, a sampling control circuit 406, and a set of sample registers 408.

The ADC 402 is coupled to a communications link to receive incoming analog signals. In response to a sampling clock signal from the sampling control circuit 406, the ADC 402 samples an incoming analog signal at a particular sampling point, and converts that analog signal into a representative x-bit digital value (where x may be any integer greater than one, e.g. 4). The digital value (i.e. the sample value) is passed to the output determination circuit 404, which processes the digital value to determine whether the received analog signal represented by the digital value was a digital 1 or a digital 0. In making this determination, the output determination circuit 404 may implement some compensation techniques to compensate for the effects of previously sent signals. After this determination is made, the output determination circuit 404 outputs an appropriate digital bit (digital 1 or 0), which is provided to an output consumer. In this manner, the receiver 304 is able to receive an analog signal, and turn it into a representative digital output bit.

As noted above, the sampling control circuit 406 provides a sampling clock signal to the ADC 402. It is this sampling clock signal that determines at what point within a time interval the ADC 402 samples an incoming analog signal. The sampling clock signal may cause the ADC 402 to sample an analog signal at the beginning of the time interval, at the end of the time interval, or at some point in between. In one embodiment, the sampling point may be adjusted based upon a jog control signal received from the WCM 310. This jog control signal causes the sampling point to be jogged or moved by a certain amount to a different sampling point.

Figure 5:
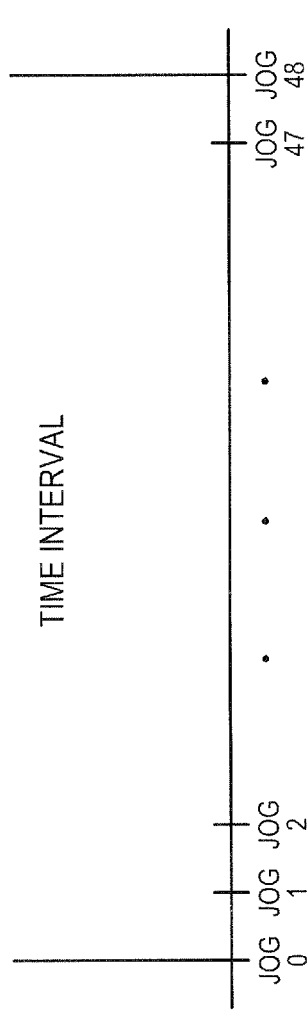
FIG. 5 depicts a time interval and the various jog points within the time interval at which samples may be taken.

To illustrate the concept of a jog, reference will be made to the example shown in FIG. 5, in which a single time interval is shown. In the example of FIG. 5, each jog is ⅟48 of a time interval. If the sampling point is not jogged (i.e. the jog is 0), the analog signal will be sampled at the beginning of the time interval, indicated by jog 0. If the sampling point is jogged by 1 jog increment, the analog signal will be sampled at the point indicated by jog 1 (near the beginning of the time interval). If the sampling point is jogged by 47 jog increments, the analog signal will be sampled at the point indicated by jog 47 (near the end of the time interval). Thus, by jogging the sampling point, the analog signal may be sampled at various points within the time interval. This in turn makes it possible to oversample the analog signal using a relatively slow clock frequency.

An interesting point to note is that if the sampling point is jogged by 48 jog increments or more, the analog signal will not be sampled until the next or a subsequent time interval. The practical effect of this is that it would no longer be the analog signal in this time interval that would be sampled; rather, it would be the analog signal in the next or a subsequent time interval that would be sampled. In one embodiment, it is possible to jog the sampling point by any amount of jog increments. Thus, it is possible to sample an analog signal in a next time interval or in any subsequent time interval. The significance and use of this jogging capability will be elaborated upon in a later section.

As noted previously, the ADC 402 provides the converted digital values (i.e. the sample values) to the output determination circuit 404 for further processing. In one embodiment, the ADC 402 also provides the sample values to the sample registers 408. It is the sample registers 408 that are responsible for storing the sample values, and providing them to the WCM 310. To keep the resources implemented on the receiver 304 to a minimum, the number of sample registers 408 is kept relatively small. Thus, the sample registers 408 store just a subset of sample values at a time.

In one embodiment, the sample registers 408 operate in response to a trigger signal received from the WCM 310, a data clock signal, and a system clock signal. In one embodiment, the system clock signal is a certain multiple slower than the data clock signal. The significance of this will be made clear in a later section. In one embodiment, the sample registers 408 operate as follows. Initially, the sample registers 408 waits for a trigger signal from the WCM 310. When this trigger signal is received, the sample registers 408 wait for the next rising edge of the system clock signal. When that rising edge is detected, the sample registers 408 operate, in response to the data clock signal, to store a plurality of sets of sample values from the ADC 402, with one sample value being stored per data clock cycle. The sample registers 408 continue to store sample values until the falling edge of the system clock signal is detected. At that point, the sample registers 408 stop storing sample values, and start providing the stored sampled values to the WCM 310 on the data out lines. In one embodiment, the sample registers 408 provide the stored sample values repeatedly on the data out lines; thus, the WCM 310 can read those sample values at any desired time. The sample registers 408 continue to output the stored sample values until another trigger signal is received from the WCM 310. In response to the trigger signal, the sample registers 408 repeat the operation described above. In this manner, the sample registers 408 store a plurality of subsets of sample values (one subset at a time) and provide a plurality of subsets of sample values (one subset at a time) to the WCM 310. Based upon these subsets of sample values, the WCM 310 constructs the oversampled waveform for the incoming signals received by the receiver 304.

Sample Operation

To illustrate how a receiver 304 and the WCM 310 may interact to construct an oversampled waveform, a sample operation of the system 300 will now be described. In the following description, it will be assumed that interconnect 306 (FIG. 3) has coupled WCM 310 to receiver 304(1) so that the interaction described below is between receiver 304(1) and WCM 310.

In the sample operation, it is assumed that the receiver 304(1) is coupled to a transmitter (not shown) that is capable of sending a predetermined bit pattern. In one embodiment, the bit pattern that is sent by the transmitter is the well known PRBS7+"1" bit pattern, which is 128 bits long. For the sake of completeness, the PRBS7+"1" bit pattern is provided below:
1111111000000010000011000010100011110010010 1100111010100111101000011100010010011011010 110111101100011010010111011100110010101010.

To send this bit pattern, the transmitter sends a series of positive and negative voltage pulses (e.g. a positive voltage pulse for each "1" and a negative voltage pulse for each "0"), with each pulse lasting one time interval. Thus, the bit pattern is sent over a period of 128 time intervals, and is received by the receiver 304(1) over a period of 128 time intervals. After sending all 128 pulses, the transmitter starts from the beginning and sends all 128 pulses again. In one embodiment, the transmitter sends the bit pattern repeatedly to enable the receiver 304(1) to sample, store, and provide all of the necessary subsets of sample values to the WCM 310. It should be noted that the PRBS7+"1" bit pattern is used for illustrative purposes only. If so desired, other bit patterns may be sent.

Figure 6:
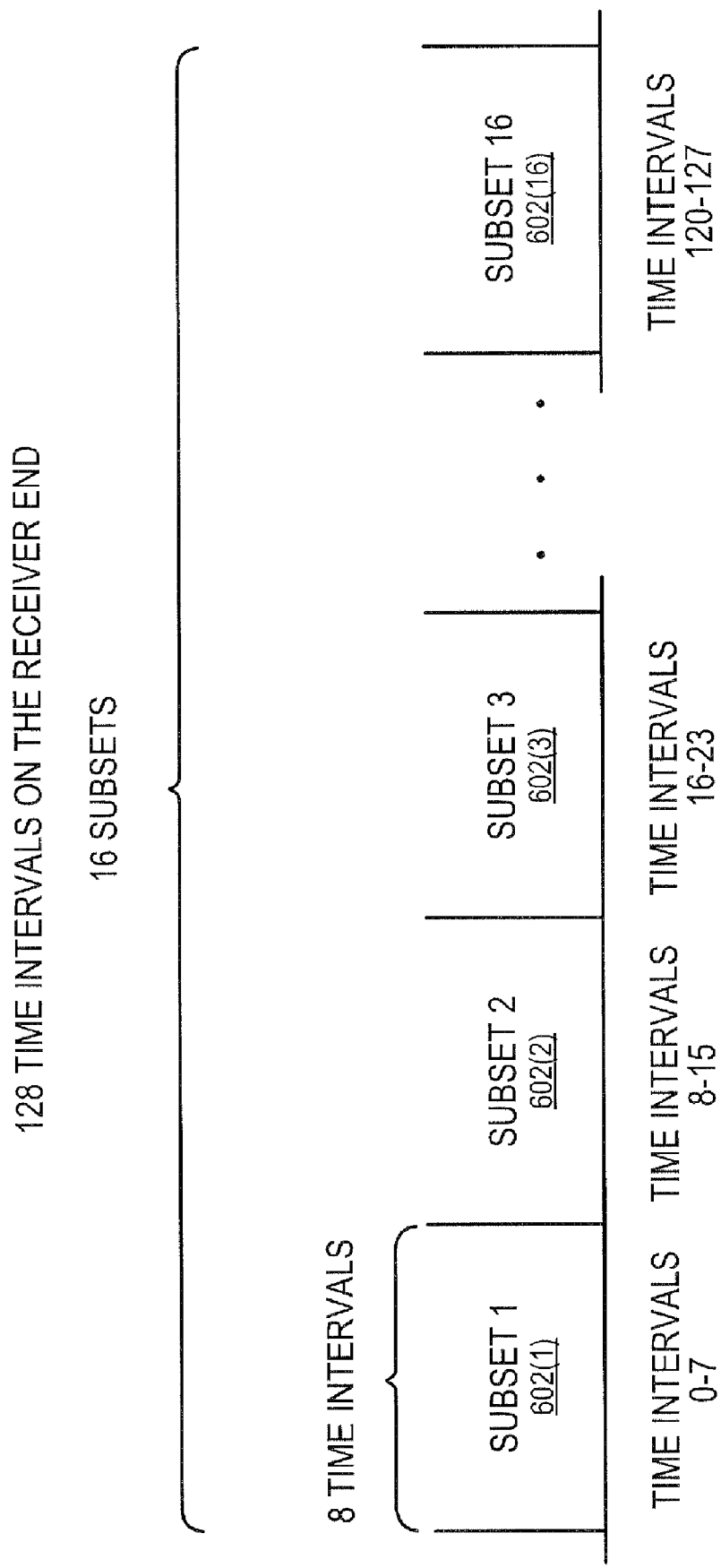
FIG. 6 depicts a series of 128 time intervals on the receiver end, where the time intervals are divided into 16 subsets of time intervals and each subset has 8 time intervals.

To facilitate discussion, the 128 time intervals on the receiver end may be divided into an r number of subsets, with each subset having an s number of time intervals. In the example shown in FIG. 6, r is 16 and s is 8; thus, the 128 time intervals on the receiver end are divided into 16 subsets 602(1)-602(16) of time intervals with each subset 602 having 8 time intervals (note: this division of the time intervals is for illustrative purposes only; r and s may take on other values if so desired).

Since each subset 602 comprises 8 time intervals, the number of sample registers 408 (FIG. 4) in the receiver 304(1) is set to 8 in this example. Furthermore, the system clock signal is established so that its frequency is ⅛ that of the data clock signal. Set up in this manner, each time the sample registers 408 are triggered, they will store 8 sample values. These 8 sample values will be the sample values for a subset of 8 time intervals, and each sample value will correspond to one of those 8 time intervals.

In the following sample operation, it will be assumed that 48x oversampling is desired (i.e. it is desired to sample an analog signal at 48 different sampling points within a time interval). In light of this assumption, the jog increment is set to 1/48 of a time interval (see FIG. 5) in the following example. That way, each time the sampling point is jogged by one jog increment, it is moved by 1/48 of a time interval. It should be noted that 48x oversampling is used for illustrative purposes only; if so desired, the time intervals may be oversampled a different number of times.

Receiving Sample Values

With the above information in mind, a sample operation of the system will now be described. Initially, the processor 312 (FIG. 3) executes the waveform construction code 316 stored in the storage 314. Under control of the waveform construction code 316, the processor 312 performs the following operations. In one embodiment, the processor 312 begins the waveform construction process by sending a control signal to a transmitter (not shown) that is coupled to the receiver 304(1) to instruct the transmitter to start sending the predetermined bit pattern. In addition, the processor 312 sends a jog control signal to the sampling control circuit 406 (FIG. 4) of the receiver 304(1) to cause the sampling control circuit 406 to set the jog to 0. By doing so, the processor 312 causes the ADC 402 to sample the incoming analog signals at the beginning of each time interval (at sampling point jog 0 in FIG. 5).

After setting the jog to 0, the processor 312 sends a trigger signal to the sample registers 408 to cause the sample registers 408 to store a set of sample values. In response to the trigger signal, the sample registers 408 wait for the next rising edge of the system clock signal, and then store the 8 sample values that are received from the ADC 402 after the rising edge of the system clock signal is detected. These 8 sample values will be the sample values for the 8 time intervals within one of the subsets 602 (FIG. 6) of time intervals. It is not known exactly which of the 16 subsets 602 the sample values correspond to, but it is known that the sample values correspond to one of the 16 subsets 602. In one embodiment, the trigger signal is asynchronous relative to the system clock and the data clock. That way, it is possible, with enough iterations, to eventually sample all of the 16 subsets 602(1)-602(16) of time intervals. After storing the 8 sample values, the sample registers 408 provide the sample values on the data out lines. At some point, the processor 312 reads the sample values from the data out lines, and stores them into the sample values portion 318 of the storage 314. In this manner, the processor 312 is able to receive a set of 8 sample values from the receiver 304(1).

To get another set of 8 sample values, the processor 312 sends another trigger signal to the sample registers 408, waits a short while, and then reads the sample values from the data out lines. Again, it will not be known exactly which of the 16 subsets 602 of time intervals the sample values correspond to, but it is known that the sample values correspond to one of the 16 subsets 602. By repeating this process, the processor 312 is able to receive a plurality of sets of sample values from the sample registers 408. To facilitate discussion, a plurality of sets of sample values will be referred to as a "mob" of sample values. With a large enough mob of sample values (e.g. 100 sets of sample values), it is quite likely that the processor 312 will receive sample values for each one of the 16 subsets 602 of time intervals. Thus, the processor 312 will have sample values for all of the time intervals in the 128 time intervals. Recall that the current jog is 0; thus, all of these sample values will have been taken by the ADC 402 at the beginning of each time interval. To facilitate discussion, this mob of sample values will be referred to as mob 0 (the mob of sample values taken at jog 0).

Sorting and Grouping of the Sets of Sample Values Within a Mob

In one embodiment, the processor 312 sorts the sets of sample values in a mob into groups. In the current example, there are 16 subsets 602 of time intervals; thus, the processor 312 will sort the mob of sample values into 16 distinct groups of sample values, with each group of sample values corresponding to one of the 16 subsets 602 of time intervals.

In one embodiment, the processor 312 performs the sorting function as follows. When the processor 312 receives the first set of sample values in a mob, it creates a new group (e.g. group 1) and puts that set of sample values into that group. For the next set of sample values received in the mob, the processor 312 compares the sample values in the newly received set with the sample values in group 1. If the difference between the sample values in the newly received set and the sample values in group 1 is greater than a first threshold (thereby indicating that the sample values are most likely for a different subset 602 of the time intervals), then the processor 312 creates a new group (e.g. group 2) and puts the newly received set of sample values into that group. If, on the other hand, the difference between the sample values in the newly received set and the sample values in group 1 is less than a second threshold (thereby indicating that the sample values are most likely for the same time interval subset 602), then the processor 312 puts the newly received sample values into group 1. In one embodiment, the processor averages the newly received set of sample values with the existing sample values in group 1 to derive a single set of averaged sample values for group 1. As a third possibility, if the difference between the sample values in the newly received set and the sample values in group 1 is less than the first threshold but greater than the second threshold, the processor 312 discards the newly received set of sample values (in such a case, there is uncertainty; thus, the sample values are not used). For the sake of example, it will be assumed that the newly received set of sample values is significantly different from the sample values in group 1; thus, the processor 312 creates a new group (e.g. group 2) and puts the newly received set of sample values into that group.

For the next set of sample values received in the mob, the processor 312 compares the sample values in the newly received set with the sample values in groups 1 and 2. If the difference between the sample values in the newly received set and the sample values in group 1 is above the first threshold, and if the difference between the sample values in the newly received set and the sample values in group 2 is also above the first threshold, then the processor 312 creates a new group (e.g. group 3) and puts the newly received set of sample values into that group. On the other hand, if the difference between the sample values in the newly received set and the sample values in group 1 is below the second threshold, then the processor 312 puts the newly received sample values into group 1. Alternatively, if the difference between the sample values in the newly received set and the sample values in group 2 is below the second threshold, then the processor 312 puts the newly received sample values into group 2. If the newly received set of sample values is put into one of the existing groups, its sample values are averaged with the current sample values in that group to derive a single set of averaged sample values for that group. As a third possibility, if a new group is not created, and if the newly received set of sample values is not put into one of the existing groups, then the newly received set of sample values is discarded (due to lack of certainty). For the sake of example, it will be assumed that the newly received set of sample values is significantly different from the sample values in both groups 1 and 2; thus, the processor 312 creates a new group (e.g. group 3) and puts the newly received set of sample values into that group.

For each subsequent set of sample values received in the mob, the same general process is repeated. Specifically, the processor 312 compares the sample values in the newly received set with the averaged sample values in each of the existing groups. If the difference between the sample values in the newly received set and the averaged sample values in each of the existing groups is above the first threshold, then the processor 312 creates a new group and puts the newly received set of sample values into that group. On the other hand, if the difference between the sample values in the newly received set and the averaged sample values in any of the existing groups is below a certain threshold, then the processor 312 puts the newly received sample values into that existing group, and averages the newly received sample values with the sample values in that group to derive a new set of averaged sample values for that group. As a third possibility, if a new group is not created, and if the newly received set of sample values is not put into one of the existing groups, then the newly received set of sample values is discarded (due to lack of certainty). This process is performed for every set of sample values in the mob. After a sufficient number (e.g. 100) of sets of sample values have been processed, the mob should have (barring some error) 16 distinct groups of sample values, with each group corresponding to one of the 16 subsets 602 of time intervals, and each group having a set of averaged sample values. In one embodiment, if the sorting process ends up with more than or fewer than 16 groups for a mob, the processor 312 will discard the results and repeat the sampling and sorting process for the mob.

Figure 7:
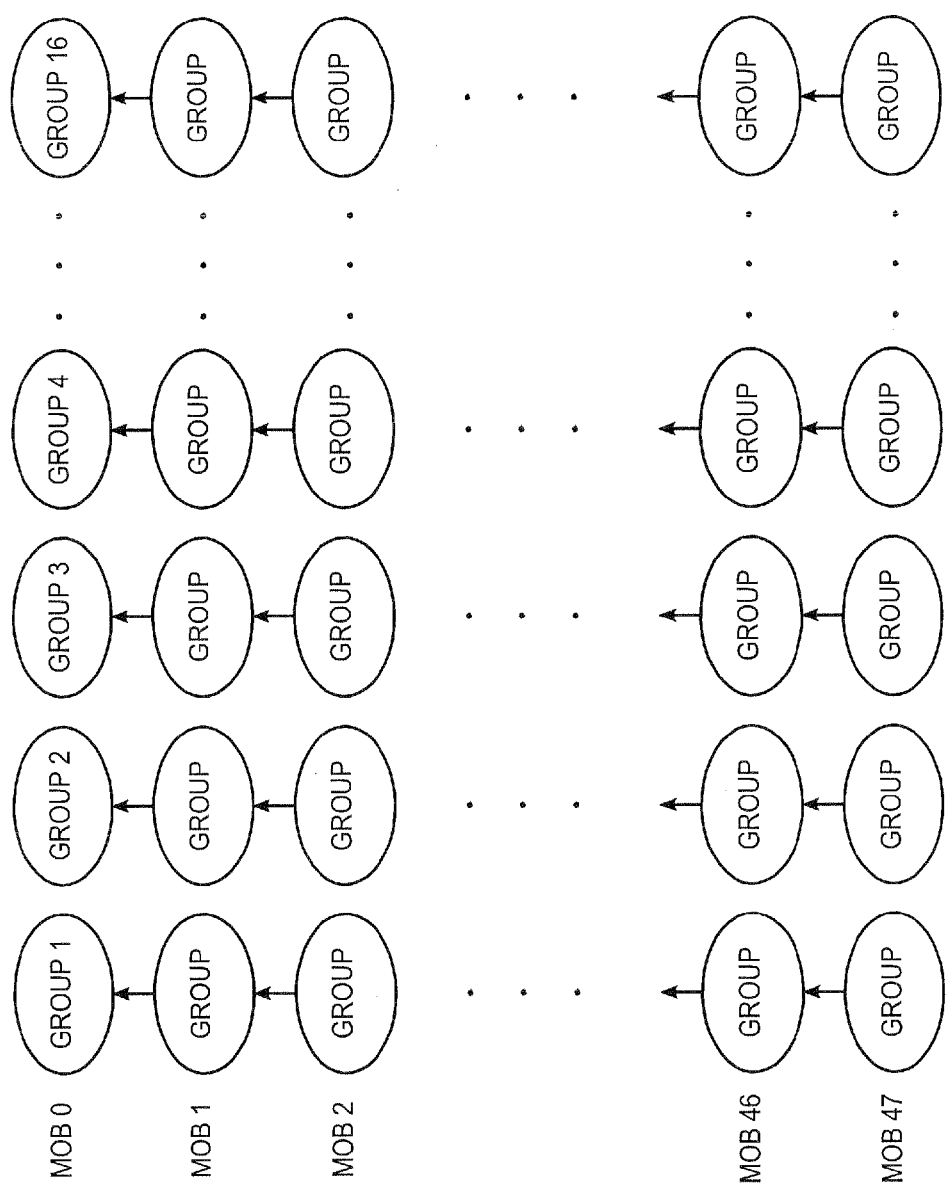
FIG. 7 depicts 48 mobs of sample values, wherein each mob has 16 groups of sample values, wherein each group of sample values in a mob is associated with a corresponding group in an immediately preceding mob, and wherein the samples in different mobs are taken at different sampling points.

The result of the sorting and grouping process is shown in FIG. 7, in which the sets of sample values for mob 0 are shown as being sorted into 16 groups (groups 1-16). Note that even though the sets of sample values have been sorted into 16 groups, it is still not known how the groups relate to each other in terms of a sequential order. For example, the sample values in group 1 may correspond to time interval subset 3 602(3) while the sample values in group 2 may correspond to time interval subset 9 602(9). Thus, group 2 does not necessarily follow group 1 in terms of a sequential order. In one embodiment, the sequential ordering of the groups is determined at a later time, as will be described in a later section.

Associating Groups in One Mob with Groups in Other Mobs

In the manner described above, the processor 312 receives the various sets of sample values for mob 0, and sorts them into 16 distinct groups. After the sample values for mob 0 are received and sorted, the processor 312 sends a jog control signal to the sampling control circuit 406 (FIG. 4) to cause the sampling control circuit 406 to jog the sampling point by one jog increment. By doing so, the processor 312 causes the ADC 402 to now sample the incoming analog signals at the jog 1 sampling point (see FIG. 5).

After setting the jog to 1, the processor 312 sends a trigger signal to the sample registers 408 to cause the sample registers 408 to store a set of sample values. In response to the trigger signal, the sample registers 408 wait for the next rising edge of the system clock signal, and then store the 8 sample values that are received from the ADC 402 after the rising edge of the system clock signal is detected. After storing the 8 sample values, the sample registers 408 provide the sample values on the data out lines. At some point, the processor 312 reads the sample values from the data out lines, and stores them into the sample values portion 318 of the storage 314. In this manner, the processor 312 is able to receive a set of 8 sample values from the receiver 304(1). The processor 312 repeats this process to receive a plurality of sets of sample values from the sample registers 408. Since the current jog is 1, all of these sample values will have been taken by the ADC 402 at the jog 1 sampling point. That being the case, this mob of sample values will be referred to as mob 1 (the mob of sample values taken at jog 1).

As the processor 312 receives the sets of sample values for mob 1, it sorts them into 16 distinct groups of sample values. The processor 312 may sort the sets of sample values in mob 1 in the same manner as it did the sets of sample values in mob 0. At the end of the sorting and grouping process (barring some error), mob 1 should have 16 groups of sample values, as shown in FIG. 7. Note, however, that at this point the groups in mob 1 have no correlation with the groups in mob 0. That is, it is not known whether group 1 in mob 0 and group 1 in mob 1 contain sample values for the same subset 602 of time intervals. For example, group 1 in mob 0 may contain sample values for time interval subset 3 602(3) while group 1 in mob 1 may contain sample values for time interval subset 16 602(16). In one embodiment, after the processor 312 sorts the sets of sample values in mob 1 into 16 groups, it associates each one of those groups with a corresponding group in mob 0. In effect, it reorders the groups in mob 1 to correspond to the ordering of the groups in mob 0. This association may be carried out as follows.

Initially, the processor 312 selects one of the groups in mob 1. It then compares the averaged sample values in the selected group in mob 1 with the averaged sample values of the groups in mob 0. The purpose of this comparison is to determine which group in mob 0 has averaged sample values that differ the least from the averaged sample values in the selected group in mob 1. Upon determining which group in mob 0 differs the least from the selected group in mob 1, the processor 312 associates the selected group in mob 1 with the least different group in mob 0. By making this association, the processor 312 is basically concluding that the associated groups in the two mobs contain sample values for the same subset 602 of time intervals. Recall that the sample values in mob 1 are taken just one jog increment after the sample values in mob 0. That being the case, the sample values for the same subset 602 of time intervals should not be that different. Thus, it is safe to conclude that the two least different (or most similar) groups in the two mobs contain sample values for the same subset 602 of time intervals and hence can be associated with each other.

After the processor 312 associates the currently selected group in mob 1 with a group in mob 0, the processor 312 selects another group in mob 1 and repeats the process. At the end of this association process, each group in mob 1 will be associated with a corresponding group in mob 0, as shown in FIG. 7. Barring some error, there should be a one-to-one correspondence between the groups of the mobs so that no group in mob 0 should be associated with more than one group in mob 1.

After the sample values for mob 1 are received and sorted, and after the groups of mob 1 are associated with the groups of mob 0, the processor 312 again sends a jog control signal to the sampling control circuit 406 (FIG. 4) to cause the sampling control circuit 406 to jog the sampling point by one jog increment. By doing so, the processor 312 causes the ADC 402 to now sample the incoming analog signals at the jog 2 sampling point (see FIG. 5).

After setting the jog to 2, the processor 312 operates, in the manner described previously, to receive a plurality of sets of sample values from the sample registers 408. Since the current jog is 2, all of these sample values will have been taken by the ADC 402 at the jog 2 sampling point. That being the case, this mob of sample values will be referred to as mob 2 (the mob of sample values taken at jog 2). As the processor 312 receives the sets of sample values for mob 2, it sorts them, in the manner described above, into 16 distinct groups of sample values.

The processor 312 then associates, in the manner described previously, each of the groups in mob 2 with a corresponding group in the immediately preceding mob (mob 1). Specifically, the processor 312 selects one of the groups in mob 2, and compares the averaged sample values in the selected group in mob 2 with the averaged sample values of the groups in mob 1. The purpose of this comparison is to determine which group in mob 1 has averaged sample values that differ the least from the averaged sample values in the selected group in mob 2. Upon determining which group in mob 1 differs the least from the selected group in mob 2, the processor 312 associates the selected group in mob 2 with the least different group in mob 1. After the processor 312 associates the currently selected group in mob 2 with a group in mob 1, the processor 312 selects another group in mob 2 and repeats the process. At the end of this association process, each group in mob 2 will be associated with a corresponding group in mob 1, as shown in FIG. 7. Barring some error, there should be a one-to-one correspondence between the groups of the mobs so that no group in mob 1 should be associated with more than one group in mob 2. Since each group in mob 2 is associated with a corresponding group in mob 1, and since each group in mob 1 is associated with a corresponding group in mob 0, each group in mob 2 is in effect associated with a corresponding group in mob 0 through a transitive association. With this association, it can be determined which groups in mobs 0, 1, and 2 contain sample values for the same time interval subset 602.

The above discussion shows how the processor 312 may receive, sort, group, and associate sets of sample values to give rise to mobs 0, 1, and 2. This same process may be repeated to give rise to mobs 3 through 47. By the time processing of mob 47 has been completed, the sampling point will have been jogged from jog 0 to jog 47 (see FIG. 5). This in turn means that each time interval within each subset 602 of time intervals will have been sampled at 48 different sampling points (i.e. will have been 48x oversampled). Thus, by the time processing of mob 47 has been completed, the processor 312 will have all of the sample values that it needs to construct a 48x oversampled waveform for the signals received by the receiver 304(1). However, the processor 312 still does not know how the various groups should be sequentially ordered (recall that group 2 does not necessarily follow group 1 in sequential order, and group 3 does not necessarily follow group 2 in sequential order). Without this sequential ordering information, the processor 312 is not able to construct a waveform that accurate reflects, from a timing and sequence standpoint, the signals actually received by the receiver 304(1).

Determining Sequential Ordering of Groups

In one embodiment, to determine the sequential ordering of the various groups in the various mobs, the processor 312 performs additional processing. Specifically, the processor 312 does not stop with mob 47. Rather, it continues to jog the sampling point, continues to receive, sort, and group sample values to give rise to mobs, and continues to associate groups of sample values in one mob with corresponding groups of sample values in an immediately preceding mob until the sampling point has been jogged to jog 384 (which is equal to 8 times 48). By the end of this process, the processor 312 will have given rise to mobs 48 through 384 (in addition to mobs 0 through 47), as shown in FIG. 8. Each mob contains sample values taken at a different sampling point (i.e. at a different jog point), each mob has 16 groups of sample values, and each group of each mob is associated with a corresponding group in an immediately preceding mob. Thus, each group in mob 384 is associated with a corresponding group in mob 383, each group in mob 383 is associated with a corresponding group in mob 382, and so on. Through this transitive association, each group in mob 384 is in effect associated with a corresponding group in mob 0. Thus, one of the groups 802(1) in mob 384 is associated with group 1 of mob 0, another group 802(2) in mob 384 is associated with group 2 of mob 0, another group 802(3) in mob 384 is associated with group 3 of mob 0, and so on. This association may be exploited to enable a sequential ordering between the groups to be determined.

Figure 9:
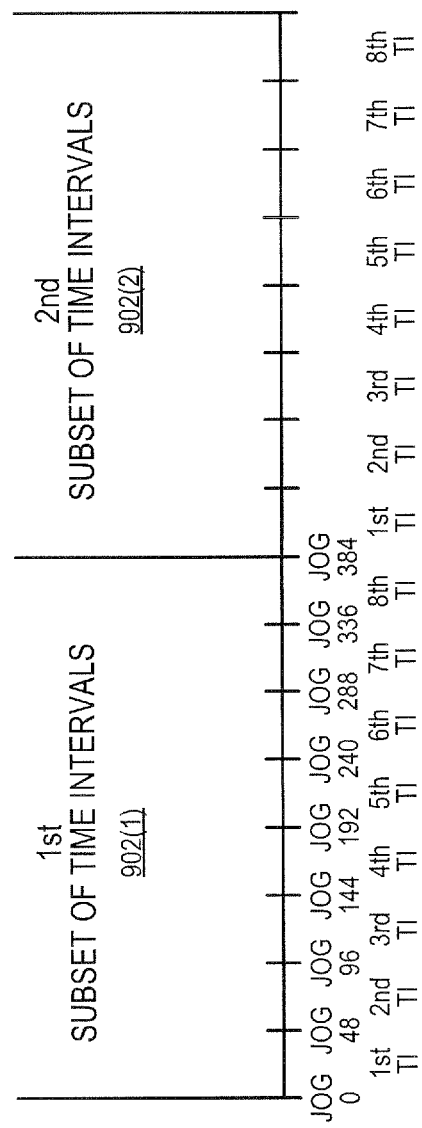
FIG. 9 depicts two consecutive subsets of time intervals to illustrate how jogging the sampling point determines which time intervals are sampled.

From an order determining standpoint, mob 384 (also referred to as the order determining (OD) mob), is significant. This is because the groups in mob 384 contain sample values taken at jog point 384. To illustrate the significance of jog point 384, reference will be made to FIG. 9. FIG. 9 shows two consecutive subsets 902(1), 902(2) of time intervals, with each subset having 8 time intervals (TI's). These two consecutive subsets 902(1), 902(2) may be any two consecutive subsets of the subsets 602 shown in FIG. 6 (e.g. subsets 602(2) and 602(3)). FIG. 9 also shows the various jog points.

When the jog point is set to jog 0, sampling will be done at the beginning of each time interval, and the time intervals in which the samples will be taken will be the 8 time intervals in the first subset 902(1). By the time the jog point is moved to jog 48, this is no longer the case. At jog point 48, sampling will still be done at the beginning of each time interval, but the time intervals in which the samples will be taken will be the last 7 time intervals in the first subset 902(1) and the first time interval in the second subset 902(2). A sample will no longer be taken in the first time interval of the first subset 902(1). In effect, the sampling point has been shifted by an entire time interval. By the time the jog point is moved to jog 96, sampling will still be done at the beginning of each time interval, but the time intervals in which the samples will be taken will be the last 6 time intervals in the first subset 902(1) and the first two time intervals in the second subset 902(2). Samples will no longer be taken in the first two time intervals of the first subset 902(1). In effect, the sampling point has been shifted by two time intervals. By the time the jog point is moved all the way to jog 384, no sampling will be done in any of the time intervals in the first subset 902(1). Rather, the time intervals in which the samples will be taken will be the 8 time intervals in the second subset 902(2). The sampling is still done at the beginning of each time interval, but the time intervals sampled will not be any of the time intervals in the first subset 902(1).

Notice that sampling the first subset 902(1) with a jog of 384 is the same as sampling the second subset 902(2) with a jog of 0. Both will result in sampling the 8 time intervals in the second subset 902(2) at the beginning of each time interval. What this means is that for each group in mob 384, there will be a group in mob 0 that has a very similar or identical set of averaged sample values (since both groups will contain sample values for the same time intervals at the same sampling point). Using this relationship, a sequential ordering of the groups can be determined. For example, FIG. 8 shows that one of the groups 802(1) in mob 384 is associated with group 1 of mob 0. Suppose now that the averaged sample values for this group 802(1) of mob 384 are very similar or identical to the averaged sample values for group 3 of mob 0. This would mean that groups 1 and 3 of mob 0 contain sample values for consecutive subsets 902(1), 902(2) of time intervals, and that group 3 of mob 0 follows group 1 of mob 0 in sequential order. Using this logic, the sequential ordering of all of the groups in mob 0 can be determined.

In one embodiment, the processor 312 determines the sequential ordering of the groups in mob 0 as follows. Initially, the processor 312 selects one of the groups in mob 384 as the currently selected group. This currently selected group in mob 384 is associated with a currently corresponding group in mob 0. The processor 312 compares the averaged sample values in the currently selected group in mob 384 with the averaged sample values in the various groups of mob 0. The purpose of this comparison is to determine which group (referred to in this discussion as the closely matching group) in mob 0 has averaged sample values that differ the least from the averaged sample values of the currently selected group in mob 384. After the closely matching group in mob 0 is determined, the processor 312 concludes that the currently corresponding group in mob 0 and the closely matching group in mob 0 are consecutive groups, and that the closely matching group follows the currently corresponding group in sequential order. In this manner, the sequential order between two of the groups in mob 0 is determined.

Thereafter, the processor 312 continues the order determining process by determining which group in mob 384 is associated with the closely matching group in mob 0 as determined above. The processor 312 then selects this group of mob 384 as the next currently selected group. The processor 312 further designates the closely matching group in mob 0 as the next currently corresponding group, and repeats the process described above. Specifically, the processor 312 compares the averaged sample values in the currently selected group in mob 384 with the averaged sample values in the various groups of mob 0. The allows the processor 312 to determine which closely matching group in mob 0 has averaged sample values that differ the least from the averaged sample values of the currently selected group in mob 384. After the closely matching group in mob 0 is determined, the processor 312 concludes that the currently corresponding group in mob 0 and the closely matching group in mob 0 are consecutive groups, and that the closely matching group follows the currently corresponding group in sequential order.

Thereafter, the processor 312 again determines which group in mob 384 is associated with the closely matching group in mob 0 as determined above. The processor 312 selects this group of mob 384 as the next currently selected group. The processor 312 further designates the closely matching group in mob 0 as the next currently corresponding group, and repeats the process described above. The processor 312 continues this process until each of the groups in mob 384 has been selected as the currently selected group, and all of the groups in mob 0 have been sequentially ordered.

To illustrate how this process may be specifically applied to the mobs shown in FIG. 8, reference will be made to the following example. Suppose that the processor 312 initially selects group 802(1) in mob 384 as the currently selected group. This group 802(1) of mob 384 is associated with group 1 (the currently corresponding group) of mob 0. Suppose now that the processor 312 compares the averaged sample values in this group 802(1) of mob 384 with the averaged sample values in the various groups of mob 0 and discovers that the averaged sample values in group 802(1) of mob 384 are very similar or identical to the averaged sample values in group 3 of mob 0. In such a case, the processor 312 concludes that groups 1 and 3 of mob 0 are consecutive groups, and that group 3 (the closely matching group) of mob 0 follows group 1 of mob 0 in sequential order.

Thereafter, the processor 312 determines that group 802(3) of mob 384 is associated with group 3 (the closely matching group) of mob 0; thus, the processor 312 selects group 802(3) of mob 384 as the next currently selected group. It also designates group 3 of mob 0 as the next currently corresponding group. Suppose now that the processor 312 compares the averaged sample values in the currently selected group 802(3) of mob 384 with the averaged sample values in the various groups of mob 0 and discovers that the averaged sample values in group 802(3) of mob 384 are very similar or identical to the averaged sample values in group 16 of mob 0. In such a case, the processor 312 concludes that groups 3 and 16 of mob 0 are consecutive groups, and that group 16 (the closely matching group) of mob 0 follows group 3 of mob 0 in sequential order.

Thereafter, the processor 312 determines that group 802 (16) of mob 384 is associated with group 16 (the closely matching group) of mob 0; thus, the processor 312 selects group 802(16) of mob 384 as the next currently selected group. It also designates group 16 of mob 0 as the next currently corresponding group. Suppose now that the processor 312 compares the averaged sample values in the currently selected group 802(16) of mob 384 with the averaged sample values in the various groups of mob 0 and discovers that the averaged sample values in group 802(16) of mob 384 are very similar or identical to the averaged sample values in group 4 of mob 0. In such a case, the processor 312 concludes that groups 16 and 4 of mob 0 are consecutive groups, and that group 4 (the closely matching group) of mob 0 follows group 16 of mob 0 in sequential order.

The processor 312 may repeat this process until all of the groups in mob 0 have been sequentially ordered. In this manner, the processor 312 is able to derive a sequential ordering for all of the groups in mob 0. For the sake of example, it will be assumed that the sequential ordering of the groups is determined to be:

1-3-16-4-2-9-11-5-10-12-7-14-13-8-6-15.

Constructing Oversampled Waveform

Once the processor 312 has the sequential ordering of the groups in mob 0, and once it has the sample values in mobs 0 through 47, the processor 312 is able to "stitch" the sample values together to construct an oversampled waveform for the signals received by the receiver 304(1). To illustrate how the oversampled waveform may be constructed in accordance with one embodiment of the present invention, reference will be made to the following example, in which the sample sequential ordering of 1-3-16-4-2-9-11-5-10-12-7-14-13-8-6-15 will be used.

Initially, the processor 312 determines which group (group 1 in the current example) is first in the sequential ordering. The processor 312 then selects that group in mob 0, and selects each group in each of mobs 1 through 47 that is associated with that group in mob 0. In the current example, the processor 312 selects group 1 in mob 0, and selects all of the groups in mobs 1 through 47 that are associated with group 1 in mob 0. The processor 312 then obtains the averaged sample values from each one of the selected groups. In the current example, the processor 312 obtains 8 sample values from group 1 of mob 0, all of which were taken at jog 0, obtains 8 sample values from group 1 of mob 1, all of which were taken at jog 1, obtains 8 sample values from group 1 of mob 2, all of which were taken at jog 2, and so on until it obtains 8 sample values from group 1 of mob 47, all of which were taken at jog 47. Using the obtained sample values, the processor 312 constructs a super group 1, and puts all of the obtained sample values into it. Thus, super group 1 will comprise sample values for 8 time intervals with each time interval having 48 sample values. In one embodiment, the processor 312 organizes the sample values based upon the respective jog points so that, for example, the sample values for jog 1 come after the sample values for jog 0, the sample values for jog 2 come after the sample values for jog 1, and so forth. In this manner, super group 1 is created, which represents an oversampled waveform for one of the subsets of time intervals 602 in FIG. 6.

Thereafter, the processor 312 determines which group (group 3 in the current example) is next in the sequential ordering. The processor 312 then selects that group in mob 0, and selects each group in each of mobs 1 through 47 that is associated with that group in mob 0. In the current example, the processor 312 selects group 3 in mob 0, and selects all of the groups in mobs 1 through 47 that are associated with group 3 in mob 0. The processor 312 then obtains the averaged sample values from each one of the selected groups. In the current example, the processor 312 obtains 8 sample values from group 3 of mob 0, all of which were taken at jog 0, obtains 8 sample values from group 3 of mob 1, all of which were taken at jog 1, obtains 8 sample values from group 3 of mob 2, all of which were taken at jog 2, and so on until it obtains 8 sample values from group 3 of mob 47, all of which were taken at jog 47. Using the obtained sample values, the processor 312 constructs a super group 2, and puts all of the obtained sample values into it. Thus, super group 2 will comprise sample values for 8 time intervals with each time interval having 48 sample values. In one embodiment, the processor 312 organizes the sample values based upon the respective jog points so that, for example, the sample values for jog 1 come after the sample values for jog 0, the sample values for jog 2 come after the sample values for jog 1, and so forth. In this manner, super group 2 is created, which represents an oversampled waveform for a next sequential one of the subsets of time intervals 602 in FIG. 6. In one embodiment, the processor 312 puts super group 2 after super group 1 in sequence. That way, the oversampled waveform represented by super group 2 will follow the oversampled waveform represented by super group 1 in sequence.

Thereafter, the processor 312 determines which group (group 16 in the current example) is next in the sequential ordering. The processor 312 then selects that group in mob 0, and selects each group in each of mobs 1 through 47 that is associated with that group in mob 0. In the current example, the processor 312 selects group 16 in mob 0, and selects all of the groups in mobs 1 through 47 that are associated with group 16 in mob 0. The processor 312 then obtains the averaged sample values from each one of the selected groups. In the current example, the processor 312 obtains 8 sample values from group 16 of mob 0, all of which were taken at jog 0, obtains 8 sample values from group 16 of mob 1, all of which were taken at jog 1, obtains 8 sample values from group 16 of mob 2, all of which were taken at jog 2, and so on until it obtains 8 sample values from group 16 of mob 47, all of which were taken at jog 47. Using the obtained sample values, the processor 312 constructs a super group 3, and puts all of the obtained sample values into it. Thus, super group 3 will comprise sample values for 8 time intervals with each time interval having 48 sample values. In one embodiment, the processor 312 organizes the sample values based upon the respective jog points so that, for example, the sample values for jog 1 come after the sample values for jog 0, the sample values for jog 2 come after the sample values for jog 1, and so forth. In this manner, super group 3 is created, which represents an oversampled waveform for a next sequential one of the subsets of time intervals 602 in FIG. 6. In one embodiment, the processor 312 puts super group 3 after super group 2 in sequence. That way, the oversampled waveform represented by super group 3 will follow the oversampled waveform represented by super group 2 in sequence.

Figure 10:
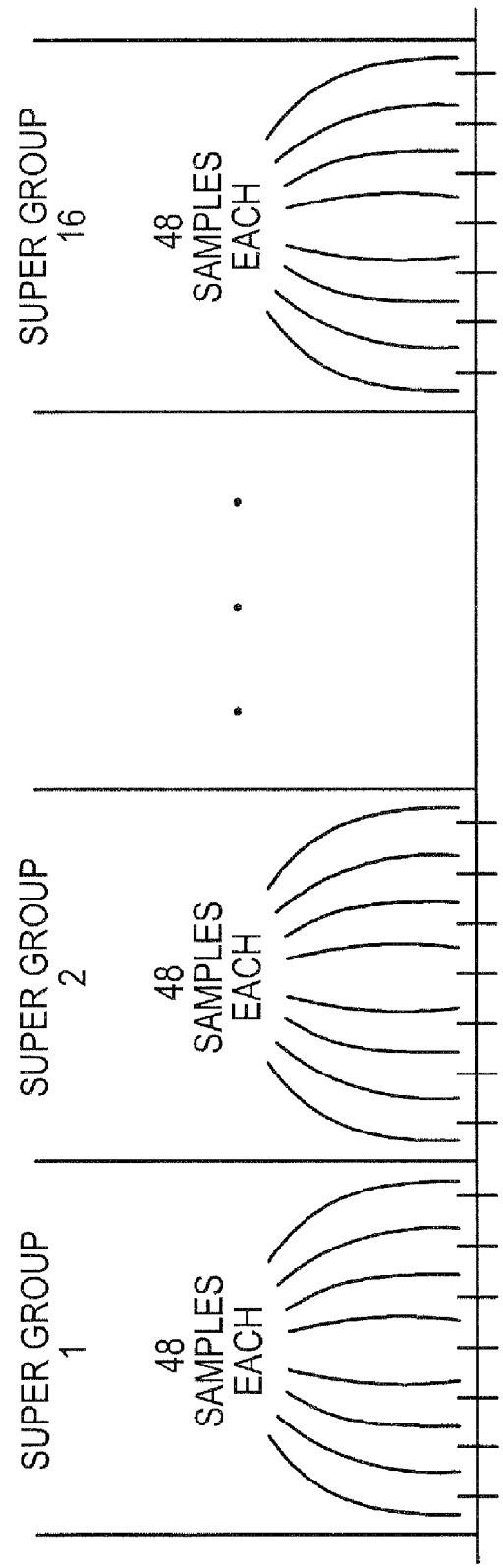
FIG. 10 depicts an oversampled waveform that is constructed in accordance with one embodiment of the present invention.

In one embodiment, the processor 312 repeats the above process until all 16 of the groups in the sequential ordering of the groups have been processed, and all 16 super groups have been created and sequential arranged. Once the process is completed, the 16 super groups, as sequentially arranged, will represent the oversampled waveform for the signals received by the receiver 304(1). A pictorial representation of the oversampled waveform is shown in FIG. 10. As shown, the oversampled waveform comprises 16 sequentially arranged super groups, with each super group having 8 time intervals, and each time interval having 48 sample values.

Derivation of Pulse Response

The above process describes how an oversampled waveform may be constructed for a set of signals received by a receiver. Once the waveform is constructed, it may be processed to derive a set of pulse response information for the receiver and the communications link to which the receiver is coupled. Specifically, the oversampled waveform may be compared with an ideal waveform to extract the pulse response information. Techniques such as FFT division and time domain de-convolution may be used for this purpose. Once the pulse response information is derived, it may be used advantageously for a variety of purposes.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method for constructing an oversampled waveform for a set of signals received by a receiver, the method comprising:

receiving a first mob of sample values from the receiver, wherein the first mob comprises an r (where r is an integer greater than one) number of groups of sample values, wherein each group of sample values comprises an s number of sample values for an s number of time intervals with each sample value representing a signal sample taken during a corresponding time interval, wherein each of the sample values in the first mob is taken by the receiver at a first sampling point within each time interval, wherein each group of sample values in the first mob is received separately, and wherein the groups of sample values in the first mob are not received in any predetermined order;

receiving a second mob of sample values from the receiver, wherein the second mob comprises an r number of groups of sample values, wherein each group of sample values comprises an s number of sample values for an s number of time intervals with each sample value representing a signal sample taken during a corresponding time interval, wherein each of the sample values in the second mob is taken by the receiver at a second sampling point within each time interval, wherein each group of sample values in the second mob is received separately, and wherein the groups of sample values in the second mob are not received in any predetermined order;

associating each group in the second mob with a corresponding group in the first mob;

determining, for each group in the first mob, which other group in the first mob follows that group to derive an overall sequential ordering of the groups in the first mob; and constructing an oversampled waveform for the set of signals received by the receiver, wherein the oversampled waveform is constructed using at least the sequential ordering of the groups in the first mob, the groups of sample values in the first mob, and the groups of sample values in the second mob.

2. The method of claim 1, further comprising:

causing, prior to receiving the first mob of sample values, the receiver to sample signals at the first sampling point within each time interval; and causing, prior to receiving the second mob of sample values, the receiver to sample signals at the second sampling point within each time interval.

3. The method of claim 1, wherein associating each group in the second mob with a corresponding group in the first mob comprises:

selecting a particular group in the second mob;

comparing the sample values in the particular group in the second mob with the sample values in at least some of the groups in the first mob;

determining which specific group in the first mob has sample values that differ the least from the sample values in the particular group in the second mob; and associating the particular group in the second mob with the specific group in the first mob.

4. The method of claim 1, wherein receiving the first mob of sample values comprises:

receiving a plurality of sets of sample values for the first mob with each set of sample values being received separately and in no predetermined order; and sorting the sets of sample values in the first mob into the r number of groups of sample values in the first mob;

and wherein receiving the second mob of sample values comprises:

receiving a plurality of sets of sample values for the second mob with each set of sample values being received separately and in no predetermined order; and sorting the sets of sample values in the second mob into the r number of groups of sample values in the second mob.

5. The method of claim 1, wherein constructing the oversampled waveform comprises:

(a) selecting a group in the first mob as a currently selected first mob group;

(b) selecting a group in the second mob that is associated with the currently selected first mob group as a currently selected second mob group;

(c) obtaining the s number of sample values in the currently selected first mob group;

(d) obtaining the s number of sample values in the currently selected second mob group;

(e) constructing a new current super group comprising the sample values from the currently selected first mob group and the sample values from the currently selected second mob group;

(f) determining which group in the first mob follows the currently selected first mob group in the overall sequential ordering of the groups in the first mob;

(g) selecting the group in the first mob that follows the currently selected first mob group in the overall sequential ordering as a next currently selected first mob group; and repeating (b) through (g) until each of the r number of groups in the first mob has been selected as the currently selected first mob group and an r number of new current super groups have been constructed, wherein the r number of new current super groups represent the oversampled waveform for the set of signals received by the receiver.

6. The method of claim 1, further comprising:

receiving a third mob of sample values from the receiver, wherein the third mob comprises an r number of groups of sample values, wherein each group of sample values comprises an s number of sample values for an s number of time intervals with each sample value representing a signal sample taken during a corresponding time interval, wherein each of the sample values in the third mob is taken by the receiver at a third sampling point within each time interval, wherein each group of sample values in the third mob is received separately, and wherein the groups of sample values in the third mob are not received in any predetermined order; and associating each group in the third mob with a corresponding group in the second mob which in turn is associated with a corresponding group in the first mob, thereby, effectively associating each group in the third mob with a corresponding group in the first mob.

7. The method of claim 6, wherein constructing the over-sampled waveform comprises:

(a) selecting a group in the first mob as a currently selected first mob group;

(b) selecting a group in the second mob that is associated with the currently selected first mob group as a currently selected second mob group;

(c) selecting a group in the third mob that is associated with the currently selected second mob group as a currently selected third mob group;

(d) obtaining the s number of sample values in the currently selected first mob group;

(e) obtaining the s number of sample values in the currently selected second mob group;

(f) obtaining the s number of sample values in the currently selected third mob group;

(g) constructing a new current super group comprising the sample values from the currently selected first mob group, the sample values from the currently selected second mob group, and the sample values from the currently selected third mob group;

(h) determining which group in the first mob follows the currently selected first mob group in the overall sequential ordering of the groups in the first mob;

(i) selecting the group in the first mob that follows the currently selected first mob group in the overall sequential ordering as a next currently selected first mob group; and repeating (b) through (i) until each of the r number of groups in the first mob has been selected as the currently selected first mob group and an r number of new current super groups have been constructed, wherein the r number of new current super groups represent the oversampled waveform for the set of signals received by the receiver.

8. The method of claim 1, wherein determining, for each group in the first mob, which other group in the first mob follows that group to derive an overall sequential ordering of the groups in the first mob comprises:

receiving an order-determining (OD) mob of sample values from the receiver, wherein the OD mob comprises an r number of groups of sample values, wherein each group of sample values comprises an s number of sample values for an s number of time intervals with each sample value representing a signal sample taken during a corresponding time interval;

associating each group in the OD mob with a corresponding group in the first mob;

selecting one of the groups in the OD mob as a selected group, wherein the selected group in the OD mob is associated with a particular group in the first mob;

comparing the sample values in the selected group of the OD mob with the sample values in at least some of the groups in the first mob;

determining which specific group in the first mob has sample values that differ the least from the sample values in the selected group in the OD mob; and concluding that the specific group in the first mob follows the particular group in the first mob in an overall sequential ordering of the groups in the first mob.

9. The method of claim 1, wherein determining, for each group in the first mob, which other group in the first mob follows that group to derive an overall sequential ordering of the groups in the first mob comprises:

(a) receiving an order-determining (OD) mob of sample values from the receiver, wherein the OD mob comprises an r number of groups of sample values, wherein each group of sample values comprises an s number of sample values for an s number of time intervals with each sample value representing a signal sample taken during a corresponding time interval;

(b) associating each group in the OD mob with a corresponding group in the first mob;

(c) selecting one of the groups in the OD mob as a currently selected group, wherein the currently selected group in the OD mob is associated with a currently corresponding group in the first mob;

(d) comparing the sample values in the currently selected group in the OD mob with the sample values in at least some of the groups in the first mob;

(e) determining which closely-matching (CM) group in the first mob has sample values that differ the least from the sample values in the currently selected group in the OD mob;

(f) concluding that the CM group in the first mob follows the currently corresponding group in the first mob in an overall sequential ordering of the groups in the first mob;

(g) determining which specific group in the OD mob is associated with the CM group in the first mob;

(h) setting the specific group in the OD mob as a next currently selected group and setting the CM group in the first mob as a next currently corresponding group; and repeating (d) through (h) until each of the r number of groups in the OD mob has been selected as the currently selected group and all of the groups in the first mob have been sequentially ordered.

10. A machine readable storage medium comprising instructions which, when executed by one or more processors, cause the one or more processors to construct an over-sampled waveform for a set of signals received by a receiver by performing the operations of:

receiving a first mob of sample values from the receiver, wherein the first mob comprises an r (where r is an integer greater than one) number of groups of sample values, wherein each group of sample values comprises an s number of sample values for an s number of time intervals with each sample value representing a signal sample taken during a corresponding time interval, wherein each of the sample values in the first mob is taken by the receiver at a first sampling point within each time interval, wherein each group of sample values in the first mob is received separately, and wherein the groups of sample values in the first mob are not received in any predetermined order;

receiving a second mob of sample values from the receiver, wherein the second mob comprises an r number of groups of sample values, wherein each group of sample values comprises an s number of sample values for an s number of time intervals with each sample value representing a signal sample taken during a corresponding time interval, wherein each of the sample values in the second mob is taken by the receiver at a second sampling point within each time interval, wherein each group of sample values in the second mob is received separately, and wherein the groups of sample values in the second mob are not received in any predetermined order;

associating each group in the second mob with a corresponding group in the first mob;

determining, for each group in the first mob, which other group in the first mob follows that group to derive an overall sequential ordering of the groups in the first mob; and constructing an oversampled waveform for the set of signals received by the receiver, wherein the oversampled waveform is constructed using at least the sequential ordering of the groups in the first mob, the groups of sample values in the first mob, and the groups of sample values in the second mob.

11. The machine readable storage medium of claim 10, further comprising instructions for causing the one or more processors to perform the operations of:

causing, prior to receiving the first mob of sample values, the receiver to sample signals at the first sampling point within each time interval; and causing, prior to receiving the second mob of sample values, the receiver to sample signals at the second sampling point within each time interval.

12. The machine readable storage medium of claim 10, wherein associating each group in the second mob with a corresponding group in the first mob comprises:

selecting a particular group in the second mob;

comparing the sample values in the particular group in the second mob with the sample values in at least some of the groups in the first mob;

determining which specific group in the first mob has sample values that differ the least from the sample values in the particular group in the second mob; and associating the particular group in the second mob with the specific group in the first mob.

13. The machine readable storage medium of claim 10, wherein receiving the first mob of sample values comprises:

receiving a plurality of sets of sample values for the first mob with each set of sample values being received separately and in no predetermined order; and sorting the sets of sample values in the first mob into the r number of groups of sample values in the first mob; and wherein receiving the second mob of sample values comprises:

receiving a plurality of sets of sample values for the second mob with each set of sample values being received separately and in no predetermined order; and sorting the sets of sample values in the second mob into the r number of groups of sample values in the second mob.

14. The machine readable storage medium of claim 10, wherein constructing the oversampled waveform comprises:

(a) selecting a group in the first mob as a currently selected first mob group;

(b) selecting a group in the second mob that is associated with the currently selected first mob group as a currently selected second mob group;

(c) obtaining the s number of sample values in the currently selected first mob group;

(d) obtaining the s number of sample values in the currently selected second mob group;

(e) constructing a new current super group comprising the sample values from the currently selected first mob group and the sample values from the currently selected second mob group;

(f) determining which group in the first mob follows the currently selected first mob group in the overall sequential ordering of the groups in the first mob;

(g) selecting the group in the first mob that follows the currently selected first mob group in the overall sequential ordering as a next currently selected first mob group; and repeating (b) through (g) until each of the r number of groups in the first mob has been selected as the currently selected first mob group and an r number of new current super groups have been constructed, wherein the r number of new current super groups represent the oversampled waveform for the set of signals received by the receiver.

15. The machine readable storage medium of claim 10, further comprising instructions for causing the one or more processors to perform the operations of:

receiving a third mob of sample values from the receiver, wherein the third mob comprises an r number of groups of sample values, wherein each group of sample values comprises an s number of sample values for an s number of time intervals with each sample value representing a signal sample taken during a corresponding time interval, wherein each of the sample values in the third mob is taken by the receiver at a third sampling point within each time interval, wherein each group of sample values in the third mob is received separately, and wherein the groups of sample values in the third mob are not received in any predetermined order; and associating each group in the third mob with a corresponding group in the second mob which in turn is associated with a corresponding group in the first mob, thereby, effectively associating each group in the third mob with a corresponding group in the first mob.

16. The machine readable storage medium of claim 15, wherein constructing the oversampled waveform comprises:

(a) selecting a group in the first mob as a currently selected first mob group;

(b) selecting a group in the second mob that is associated with the currently selected first mob group as a currently selected second mob group;

(c) selecting a group in the third mob that is associated with the currently selected second mob group as a currently selected third mob group;

(d) obtaining the s number of sample values in the currently selected first mob group;
(e) obtaining the s number of sample values in the currently selected second mob group;
(f) obtaining the s number of sample values in the currently selected third mob group;
(g) constructing a new current super group comprising the sample values from the currently selected first mob group, the sample values from the currently selected second mob group, and the sample values from the currently selected third mob group;
(h) determining which group in the first mob follows the currently selected first mob group in the overall sequential ordering of the groups in the first mob;
(i) selecting the group in the first mob that follows the currently selected first mob group in the overall sequential ordering as a next currently selected first mob group; and
repeating (b) through (i) until each of the r number of groups in the first mob has been selected as the currently selected first mob group and an r number of new current super groups have been constructed, wherein the r number of new current super groups represent the oversampled waveform for the set of signals received by the receiver.

17. The machine readable storage medium of claim 10, wherein determining, for each group in the first mob, which other group in the first mob follows that group to derive an overall sequential ordering of the groups in the first mob comprises:
receiving an order-determining (OD) mob of sample values from the receiver, wherein the OD mob comprises an r number of groups of sample values, wherein each group of sample values comprises an s number of sample values for an s number of time intervals with each sample value representing a signal sample taken during a corresponding time interval;
associating each group in the OD mob with a corresponding group in the first mob;
selecting one of the groups in the OD mob as a selected group, wherein the selected group in the OD mob is associated with a particular group in the first mob;
comparing the sample values in the selected group of the OD mob with the sample values in at least some of the groups in the first mob;
determining which specific group in the first mob has sample values that differ the least from the sample values in the selected group in the OD mob; and
concluding that the specific group in the first mob follows the particular group in the first mob in an overall sequential ordering of the groups in the first mob.

18. The machine readable storage medium of claim 10, wherein determining, for each group in the first mob, which other group in the first mob follows that group to derive an overall sequential ordering of the groups in the first mob comprises:
(a) receiving an order-determining (OD) mob of sample values from the receiver, wherein the OD mob comprises an r number of groups of sample values, wherein each group of sample values comprises an s number of sample values for an s number of time intervals with each sample value representing a signal sample taken during a corresponding time interval;
(b) associating each group in the OD mob with a corresponding group in the first mob;
(c) selecting one of the groups in the OD mob as a currently selected group, wherein the currently selected group in the OD mob is associated with a currently corresponding group in the first mob;
(d) comparing the sample values in the currently selected group in the OD mob with the sample values in at least some of the groups in the first mob;
(e) determining which closely-matching (CM) group in the first mob has sample values that differ the least from the sample values in the currently selected group in the OD mob;
(f) concluding that the CM group in the first mob follows the currently corresponding group in the first mob in an overall sequential ordering of the groups in the first mob;
(g) determining which specific group in the OD mob is associated with the CM group in the first mob;
(h) setting the specific group in the OD mob as a next currently selected group and setting the CM group in the first mob as a next currently corresponding group; and
repeating (d) through (h) until each of the r number of groups in the OD mob has been selected as the currently selected group and all of the groups in the first mob have been sequentially ordered.

19. An apparatus for constructing an oversampled waveform for a set of signals received by a receiver, comprising:
one or more processors; and
a machine readable storage medium comprising instructions which, when executed by the one or more processors, cause the one or more processors to perform the operations of:
receiving a first mob of sample values from the receiver, wherein the first mob comprises an r (where r is an integer greater than one) number of groups of sample values, wherein each group of sample values comprises an s number of sample values for an s number of time intervals with each sample value representing a signal sample taken during a corresponding time interval, wherein each of the sample values in the first mob is taken by the receiver at a first sampling point within each time interval, wherein each group of sample values in the first mob is received separately, and wherein the groups of sample values in the first mob are not received in any predetermined order;
receiving a second mob of sample values from the receiver, wherein the second mob comprises an r number of groups of sample values, wherein each group of sample values comprises an s number of sample values for an s number of time intervals with each sample value representing a signal sample taken during a corresponding time interval, wherein each of the sample values in the second mob is taken by the receiver at a second sampling point within each time interval, wherein each group of sample values in the second mob is received separately, and wherein the groups of sample values in the second mob are not received in any predetermined order;
associating each group in the second mob with a corresponding group in the first mob;
determining, for each group in the first mob, which other group in the first mob follows that group to derive an overall sequential ordering of the groups in the first mob; and
constructing an oversampled waveform for the set of signals received by the receiver, wherein the oversampled waveform is constructed using at least the sequential ordering of the groups in the first mob, the groups of sample values in the first mob, and the groups of sample values in the second mob.

20. The apparatus of claim 19, wherein determining, for each group in the first mob, which other group in the first mob follows that group to derive an overall sequential ordering of the groups in the first mob comprises:

receiving an order-determining (OD) mob of sample values from the receiver, wherein the OD mob comprises an r number of groups of sample values, wherein each group of sample values comprises an s number of sample values for an s number of time intervals with each sample value representing a signal sample taken during a corresponding time interval;

associating each group in the OD mob with a corresponding group in the first mob;

selecting one of the groups in the OD mob as a selected group, wherein the selected group in the OD mob is associated with a particular group in the first mob;

comparing the sample values in the selected group of the OD mob with the sample values in at least some of the groups in the first mob;

determining which specific group in the first mob has sample values that differ the least from the sample values in the selected group in the OD mob; and concluding that the specific group in the first mob follows the particular group in the first mob in an overall sequential ordering of the groups in the first mob.

* * * * *